Sept. 22, 1931.  F. A. BYLES  1,824,704
ELECTRICAL REGULATING SYSTEM
Filed June 23, 1930
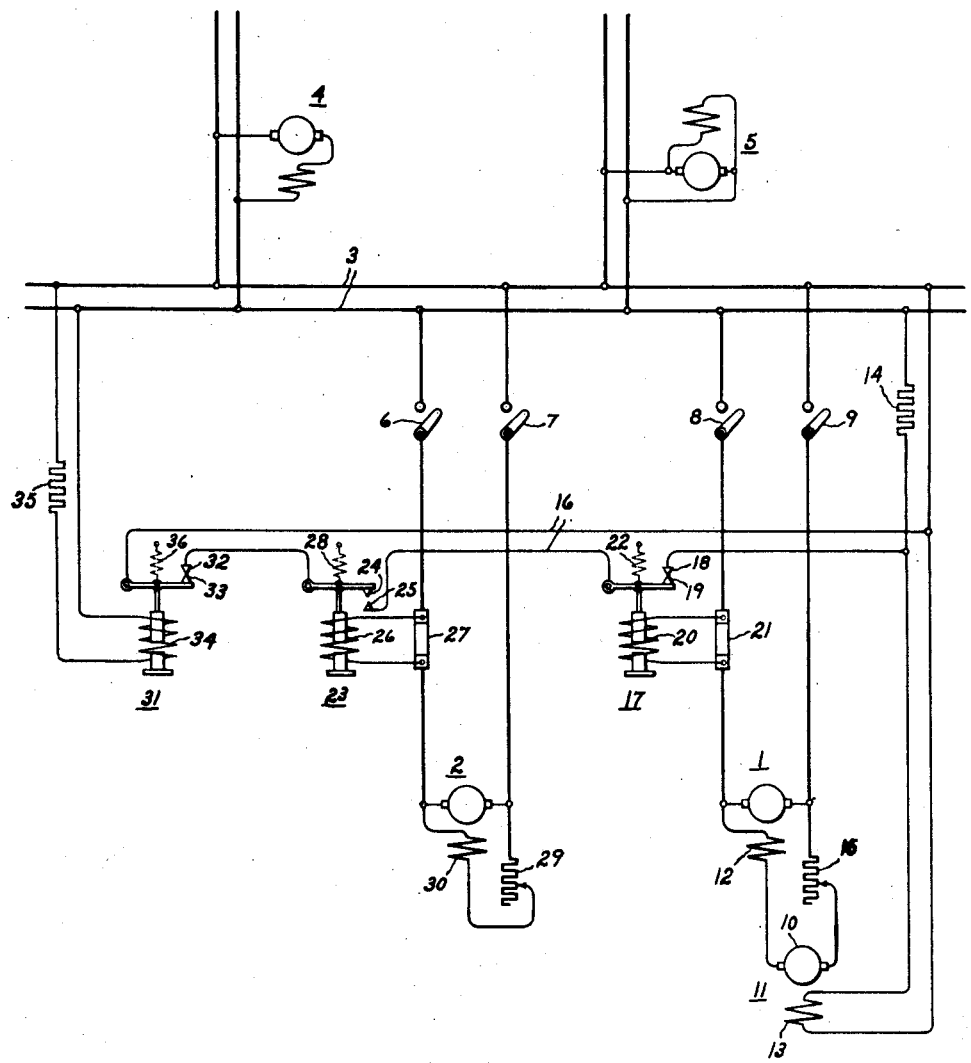
Inventor:
Frank A. Byles,
by Charles V. Tulla
His Attorney.

UNITED STATES PATENT OFFICE

FRANK A. BYLES, OF SCOTIA, NEW YORK, ASSIGNOR TO GENERAL ELECTRIC COMPANY, A CORPORATION OF NEW YORK

ELECTRICAL REGULATING SYSTEM

Application filed June 23, 1930. Serial No. 463,309.

My invention relates to electrical regulators and regulating systems and more particularly to the regulation of the operation of a plurality of parallel connected dynamo electric machines.

In many large industrial plants the amount of electrical energy required at any instant for industrial and manufacturing processes varies considerably from time to time throughout the day or week. It often happens that the generator for supplying such a load will be unable to deliver all the energy required during the peak load periods, either because of the original size of the plant or because the plant has outgrown the generating equipment. In such cases it is desirable and necessary to provide the generating equipment with regulating or control means to prevent its being overloaded during these periods and also to provide additional generating equipment for supplying the peak loads. As, however, the original generating equipment will alone be able to supply the load most of the time it is desirable because it is more economical, that the additional generating equipment supply energy only at times when the load exceeds the capacity of the original generating equipment.

In accordance with my invention I provide extremely simple means for causing one of a plurality of parallel connected electrical generators to supply all of the energy required by a variable load, up to the capacity of this generator, while at the same time preventing reverse current in the other generator or generators and for causing said other generator or generators to supply any energy required by the load which is in excess of the energy which the first generator is capable of delivering. This means is also associated with an over voltage protective relay for limiting the voltage of the circuit to which the load is connected.

An object of my invention is to provide new and improved means for regulating the operation of parallel connected electrical generators.

Another object of my invention is to provide a new and improved regulating system whereby a full load current holding regulator associated with one of a plurality of parallel connected generators has its action modified by a minimum current responsive element associated with another of said parallel connected generators.

An additional object of my invention is to provide an electrical regulating system which acts to hold full load current in one of a plurality of parallel connected electrical generators while limiting the minimum current in another of said generators and at the same time limiting the voltage of a circuit to which these generators are connected.

My invention will be better understood from the following description taken in connection with the accompanying drawing and its scope will be pointed out in the appended claims.

Referring now to the single figure of the accompanying drawing, wherein I have shown diagrammatically for purposes of illustration an embodiment of my invention applied to two parallel connected direct current generators, characters 1 and 2 designate these generators which are connected by means of a common circuit 3 to variable load devices, shown as motors 4 and 5. A plurality of switches 6, 7, 8 and 9 serve to connect and disconnect machines 1 and 2 from circuit 3 when desired. As a convenient way of controlling the excitation of one of the generators, I connect the armature 10 of a counter electromotive force machine 11 in the circuit of the field winding 12 of generator 1. The field winding of the counter electromotive force machine 11 may be energized from any suitable source of current and as shown it is energized from circuit 3 through a current limiting resistor 14. Counter electromotive force machine 11 may be either a generator, in which case its armature 10 will be driving any suitable means (not shown), as from the shaft of generator 1 for example, or it may be a counter electromotive force motor, such as is described and illustrated in Letters Patent of L. W. Thomson No. 1,365,566, dated January 11, 1921, which patent is assigned to the assignee of this application. Thus by varying the energization of field winding 13 the magnitude of the counter voltage induced in the armature 10 of machine 11 will be varied thereby to vary the energization of the field winding 12 of generator 1. The usual field rheostat 15 is connected in series with armature 10 and field winding 12.

Connected to be capable of short circuiting the field winding 13 of counter electromotive force machine 11 is a regulating circuit 16. This circuit is subject to being made and broken by a relay 17, having contacts 18 and 19 in this circuit and an operating coil 20 which is connected to be energized in accordance with the current of generator 1. As a practical matter it is better not to have this current flow through the operating coil and consequently a shunt 21 is provided which produces a voltage drop that varies in accordance with the current of generator 1, the terminals of the operating coil 20 being connected across this shunt. A spring 22 serves to oppose the tendency of coil 20 to disengage the contacts and this spring, the coil 20 and shunt 21 are so constructed that the contacts 18 and 19 become disengaged when the current in generator 1 equals or exceeds its rated full load value.

Also arranged to make and break regulating circuit 16 is a relay 23 which is connected to be responsive to the current of generator 2. This relay has contacts 24 and 25 in circuit 16, an operating coil 26 connected across a shunt 27 in the circuit of generator 2 and a spring 28 for opposing the pull of coil 26. These elements are so arranged and constructed that contacts 24 and 25 disengage when a predetermined minimum value of current flows in generator 2. This generator is equipped with an adjustable field rheostat 29 in the circuit of its field winding 30.

A third means for making and breaking the regulating circuit 16 comprises an over voltage protective relay 31, having a pair of contacts 32 and 33 in circuit 16, an operating coil 34 connected through a current limiting resistor 35 to be responsive to the voltage of circuit 3 and a spring 36 which opposes the tendency of coil 34 to disengage contacts 32 and 33. These elements are so constructed that coil 34 overpowers spring 36 and disengages contacts 32 and 33 when a predetermined maximum voltage of circuit 3 is exceeded.

The operation of the illustrated embodiment of my invention is as follows: Assume that generators 1 and 2 are being driven by any suitable prime movers (not shown), that switches 6, 7, 8 and 9 are closed, that field rheostat 29 is adjusted so that the terminal voltage of generator 2 will be at its rated or normal value when this machine is delivering rated full load current and that the load on circuit 3 is greater than can be supplied by generator 1 but not greater than can be supplied by both generators 1 and 2. Under these circumstances and with the contacts of relays 17, 23 and 31 in the positions shown, regulating circuit 16 will be opened because contacts 24 and 25 of minimum current relay 23 are separated. Consequently maximum current will be flowing in the field winding of counter electromotive force machine 11 with the result that maximum counter electromotive force is being generated in the circuit of field winding 12 of generator 1. Hence the excitation and voltage of this machine will be a minimum. The result of this will be that generator 2 will tend to supply all the load as its voltage is higher than that of generator 1. However, as soon as current starts to flow in generator 2, the contacts of minimum current relay 23 will close, thereby completing regulating circuit 16. When this takes place field winding 13 of counter electromotive force machine 11 will be short circuited with the result that its counter electromotive force will drop to a minimum and consequently the excitation and voltage of generator 1 will rise.

Digressing temporarily so as to avoid future repetition it will be seen from the above that whenever regulating circuit 16 is opened the voltage of generator 1 tends to fall to a minimum while whenever this circuit is closed the voltage of generator 1 tends to rise to a maximum. It should be remembered, however, that the embodiment of my invention which is being described is merely illustrative. Thus it will readily occur to those skilled in the art that the contacts of relays 17, 23 and 31 might be reversed, that is to say, be normally open where they are now normally closed and vice versa, while at the same time machine 11 would be an exciting or boosting machine instead of a counter electromotive force or bucking machine, without departing from my invention in its broader aspects.

Returning now to the operation of the illustrated embodiment, as the voltage of generator 1 rises it will tend to supply more and more of the energy required by the load until finally it reaches full load, at which time full load or maximum current relay 17 will break circuit 16 thereby to reduce the voltage and energy output of generator 1. As soon, however, as the output of this machine falls below full load value relay 17 will again close circuit 16. Relay 17 will therefore act to hold full load on machine 1, the excess energy required by the load being automatically supplied by generator 2.

If now the energy consumption of the load falls below the full load output of generator 1, the tendency will be for the current in machine 2 to reverse, thus running this machine as a motor, for relay 17 is trying to hold full load output on machine 1. This, however, would be wasteful of energy and is obviously not desirable, therefore, as soon as the current in machine 2 falls to a predetermined minimum value, relay 23 will open regulating circuit 16 thereby to reduce the voltage and power output of generator 1. As relay 17 now remains closed because the load demand is less than the full load output of generator 1, the control has been shifted to relay 23 and this relay will open and close its contacts intermittently to hold a minimum current in generator 2 and a maximum current, as determined by the load, in generator 1.

Overvoltage relay 31 is arranged to open regulating circuit 16 and reduce the voltage of generator 1 if the voltage of circuit 3 tends to exceed a predetermined value. If the inherent voltage regulation of generators 1 and 2 is good or if comparatively small voltage variations on circuit 3 do not adversely affect the operation of the loads connected to it, relay 31 may be employed merely as a protective device. If, however, the inherent voltage regulation of generators 1 and 2 is very poor and if it is so undesirable to have a voltage variation on circuit 3 which is equal to the difference between the no load and full load terminal voltages of such machines, for a given field excitation, that it is preferable to operate one of the machines as a motor, relay 31 may be arranged to open circuit 16 before the objectionably high no load voltage is reached. When this happens, the voltage of generator 1 will be prevented from rising above the no load voltage of generator 2, so that generator 2 will operate generator 1 as a motor, thereby reducing the voltage of generator 2 due to the load placed upon it. In practical cases this will of course be a rare occurrence for if two generators are needed to supply the load, its value will rarely be less than an amount exceeding the output of one of the generators alone.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an electric circuit, a variable load connected thereto, a substantially constant voltage source of electrical energy connected thereto, a variable voltage source of electrical energy connected to said circuit, means responsive to the current flow in said second source for increasing the voltage of said variable voltage source until a predetermined value of current flows therein and for decreasing the excitation of said variable voltage source if said predetermined current value is exceeded, and means responsive to the current flow in said constant voltage source for reducing the voltage of said variable voltage source if the current flow in said constant voltage source is below a predetermined value.

2. In combination, an electric circuit, a pair of electrical generators connected thereto, one of said generators having a fixed excitation, means responsive to the current flow in the other generator for increasing the excitation of said other generator until full load current flows therein and for decreasing the excitation of said other generator if full load current therein is exceeded, and means responsive to the current flow in the generator having a fixed excitation for decreasing the excitation of said other generator if the current in the generator having a fixed excitation falls below a predetermined value regardless of the current flow in said other generator.

3. In combination, an electric circuit, a dynamo electric machine connected thereto, means associated with said machine tending to maintain a predetermined maximum current in said machine, a second dynamo electric machine connected to said circuit and means associated with both said machines tending to maintain a minimum current in said first mentioned machine until the current in said second machine reaches a predetermined maximum value.

4. In combination, an electric circuit, an electrical generator connected thereto, means including a regulating circuit for controlling the excitation of said generator, relay means actuable in response to a predetermined current flow in said generator for controlling said regulating circuit, a second electrical generator connected to said circuit, and relay means responsive to a predetermined minimum current flow in said second generator for also controlling said regulating circuit.

5. In combination, an electrical generator, means including a regulating circuit which when open causes one extreme degree of excitation of said generator and when closed causes an opposite extreme degree of excitation of said generator, relay means connected to be responsive to the current flow in said generator for intermittently opening and closing said regulating circuit so as to tend to hold a predetermined maximum current in said generator, a second electrical generator connected in parallel with said first generator, relay means connected to be responsive to the current flow in said second generator for opening and closing said regulating circuit so as to maintain a predetermined minimum current flow in said second generator while the current flow in said first mentioned generator is below its predetermined maximum value.

6. In combination, an electric circuit, a pair of electrical generators connected thereto, a regulating circuit whose completion and opening varies the excitation of one of said generators between two extremes, relay means having contacts in said regulating circuit, the contacts of said relay means moving from one circuit controlling position to another when a predetermined maximum current flow in one of said machines is exceeded, a second relay means having contacts which move from one circuit controlling position to another when the current in the other generator falls below a predetermined minimum value, and a third relay means having its contacts in said regulating circuit, said relay means being connected to said first mentioned circuit so as to move its contacts from one circuit controlling position to another at a time when the voltage of said circuit exceeds a predetermined maximum value.

7. In an electrical distribution system, in combination, an electric circuit, load devices connected thereto, a direct current generator connected to said circuit, a counter electromotive force generating machine in the field circuit of said generator, a short circuiting circuit for the field winding of said counter electromotive force machine, a relay having its contacts in said short circuiting circuit, said contacts being normally biased to circuit closing position, said relay being connected to open its contacts when a predetermined maximum current flows in said generator, a second direct current generator connected to said first mentioned circuit, a second relay having its contacts in said short circuiting circuit, said contacts being biased to circuit opening position, said second relay being connected to said second generator so as to close its contacts when a current greater than a predetermined minimum value flows in said second generator.

8. In an electrical distribution system, in combination, a direct current load circuit, load devices connected thereto, a pair of direct current generators connected to said load circuit, a counter electromotive force dynamo electric machine connected in the field winding circuit of one of said generators, a circuit for short circuiting the field winding of said counter electromotive force dynamo electric machine, a pair of relays having their contacts in said short circuiting circuit, the contacts of said relays being biased to circuit closing position, one of said relays being connected to open its contacts when a predetermined maximum current flows in said last mentioned generator, the other of said relays being connected to open its contacts when a predetermined maximum voltage occurs in said load circuit, a third relay having its contacts connected in said short circuiting circuit, the contacts of this relay being biased to circuit opening position, this relay being connected to close its contacts when a current above a predetermined minimum value flows in the other generator.

In witness whereof, I have hereunto set my hand this 20th day of June, 1930.

FRANK A. BYLES.